US005085468A

United States Patent [19]

[11] Patent Number: 5,085,468

[45] Date of Patent: Feb. 4, 1992

Billotte

[54] VEHICLE STORAGE TANK HEADBOARD

[76] Inventor: Keith Billotte, 2213 Willow La., Clearfield, Pa. 16858

[21] Appl. No.: 556,838

[22] Filed: Jul. 23, 1990

[51] Int. Cl.[5] .................... B60P 3/00

[52] U.S. Cl. .................... 280/831; 60/328; 60/454; 60/456; 60/912

[58] Field of Search .................... 180/684, 686; 280/830, 280/831; 60/328, 454, 456, 912

[56] References Cited

U.S. PATENT DOCUMENTS

| | | | |
|---|---|---|---|
| 1,302,865 | 5/1919 | Siemantel | 280/830 |
| 2,306,379 | 12/1942 | Conradson | 60/456 |
| 2,787,065 | 4/1957 | Bock et al. | 60/456 |
| 3,002,355 | 10/1961 | Bracking | 60/456 |
| 3,065,601 | 11/1962 | Comfort | 60/456 |
| 3,191,961 | 6/1965 | Brennan et al. | 60/328 |
| 3,368,617 | 2/1968 | Rosman et al. | 165/175 |
| 3,411,196 | 11/1968 | Zehnder | 29/890.043 |
| 4,043,127 | 8/1977 | Kneik | 60/454 |
| 4,469,594 | 9/1984 | Poetter | 60/454 |

*Primary Examiner*—Mitchell J. Hill

*Attorney, Agent, or Firm*—Eckert Seamans Cherin & Mellott

[57] ABSTRACT

A vehicle headboard defining a hydraulic oil storage tank for use on a vehicle is disclosed. The vehicle headboard can include a top header, a bottom header, a plurality of spaced apart transfer tubes connected between the top and bottom headers, and mounting brackets attachable to the vehicle. The top header has at least one fluid inlet, a plurality of outlets to the transfer tubes, and receives a portion of hydraulic oil in an interior volume. The bottom header has a plurality of inlets from the transfer tubes, at least one fluid outlet, and also receives a portion of hydraulic oil in an interior volume. The invention is mountable in place of a conventional headboard, and obviates the need for any further hydraulic tank, while placing the storage volume higher than the pump and also improving cooling. The headboard can accommodate various functional storage tank accessories.

19 Claims, 1 Drawing Sheet

VEHICLE STORAGE TANK HEADBOARD

BACKGROUND OF THE INVENTION

1. Field of the Invention

The invention relates to the field of hydraulic oil storage tanks for vehicles, and more particularly, to a hydraulic oil storage tank for a vehicle which is incorporated in a vehicle headboard.

2. Prior Art

Many vehicles, especially trucks, require a hydraulic oil system for operating auxiliary hydraulic equipment. Since there are numerous varied applications for the hydraulic equipment on a vehicle, such vehicles are generally custom made for a particular intended application. The hydraulic oil system is usually a modification added to a generic vehicle by an aftermarket source after the vehicle is originally manufactured. The vehicle, for example a truck, is originally manufactured with engine and passenger compartments, and a frame which is suitable for further modification and can support a vehicle bed behind the passenger compartment.

A hydraulic oil system for a vehicle, for example a truck, has at least a hydraulic oil supply, a hydraulic oil pump and one or more actuators to be driven by hydraulic oil pressure. The pump can be electrical or driven via a power take-off from the vehicle main power source. The tank is preferably mounted close to the pump in order to minimize the length of connecting lines, need for connectors, and attendant fluid friction losses. Unless the tank is mounted above the pump, some means are required in order to provide a flooded suction reservoir at the pump inlet to decrease the tendency for pump cavitation.

The hydraulic oil supply is usually carried in a cylindrical tank disposed under a lateral side of the truck bed. The mounting location of the tank must often be chosen as a compromise of space restrictions, filling access requirements, connection lines and interference with other equipment on the vehicle. For example, it is undesirable to mount the tank on the vehicle bed, as this would reduce available cargo volume. However it is desirable to mount the tank above the pump for fluid supply purposes. The tank is generally hung below the frame, although space below the frame is limited by the need for other equipment such as a fuel tank or a third axle. Mounting the hydraulic tank below the frame limits the height (if any) by which the tank can be mounted above the hydraulic oil pump, and the connecting lines to and from the tank, the pump and the actuators may become excessively long.

The work applied to the hydraulic oil in pumping and in extraction of energy by the actuators, as well as conduction of friction produced heat to the oil, are such that the hydraulic oil in the tank becomes heated. The temperature of the oil can become quite high, due to concentration of the oil in one body and due to the proportionately lower surface area of a tank, available for cooling air circulation around the tank.

There is a need for a tank which mounts above the truck frame and the pump, using a minimum of space otherwise available for cargo volume, and providing increased cooling surface area.

By law, certain types of trucks are required to have a protective headboard separating the vehicle passenger compartment from the vehicle bed. The headboard may comprise a solid plate or a number of horizontal and vertical members joined together to form a rigid framework. The horizontal and vertical members may include tubing which is welded or otherwise joined together to form a structurally rigid barrier that is light in weight. The headboard provides a measure of safety for vehicle occupants by preventing a load on the vehicle bed from shifting forward towards the vehicle passenger compartment. The headboard is relatively large and necessarily takes up space at the front of the vehicle bed. While the headboard can be made from rectangular tubing to increase strength and rigidity per unit weight, the volume within the tubing remains unused. According to the invention, it is possible to utilize the volume within the tubing as part of the vehicle hydraulic oil system, with the simultaneous benefits of oil storage above the hydraulic pump, compact storage without using space beneath the truck bed, and if needed for cooling, increased tank surface area.

SUMMARY OF THE INVENTION

It is an object of the invention to provide a hydraulic oil storage tank for a vehicle which is simple and economical to mount.

It is another object of the invention to provide a hydraulic oil storage tank for a vehicle which does not interfere with existing equipment on the vehicle or use undue space.

It is a further object of the invention to provide a hydraulic oil storage tank for a vehicle which is mountable at least partly above conventionally located hydraulic oil pumps , i.e., at or adjacent the vehicle bed, without interfering with space on the bed.

It is still another object of the invention to provide a hydraulic oil storage tank for a vehicle which has a large external area for better heat dissipation than conventional storage tanks.

It is yet another object of the invention to provide a hydraulic oil storage tank for a vehicle incorporated in a vehicle headboard and including functional accessories such as a fill tube, breather, and filters within the tank.

These and other objects are accomplished by a vehicle headboard and hydraulic oil storage tank in the same unit. The unit comprises top and bottom headers dimensioned to store a portion of hydraulic oil in a hydraulic oil system. A plurality of spaced apart transfer tubes are connected between the top and bottom headers for defining with the headers a substantially closed volume and communicating hydraulic oil between the headers. Each of the plurality of transfer tubes and headers forms a storage volume for storing a portion of the hydraulic oil in the total system, and communicating with the other storage volumes for free flow of oil. The vehicle headboard and hydraulic oil storage tank can incorporate a plurality of functional hydraulic accessories such as filters, strainers, a sight glass and temperature gauge, providing all the same benefits as a system with a tank mounted below the truck deck, but not its disadvantages, and has additional benefits as well.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
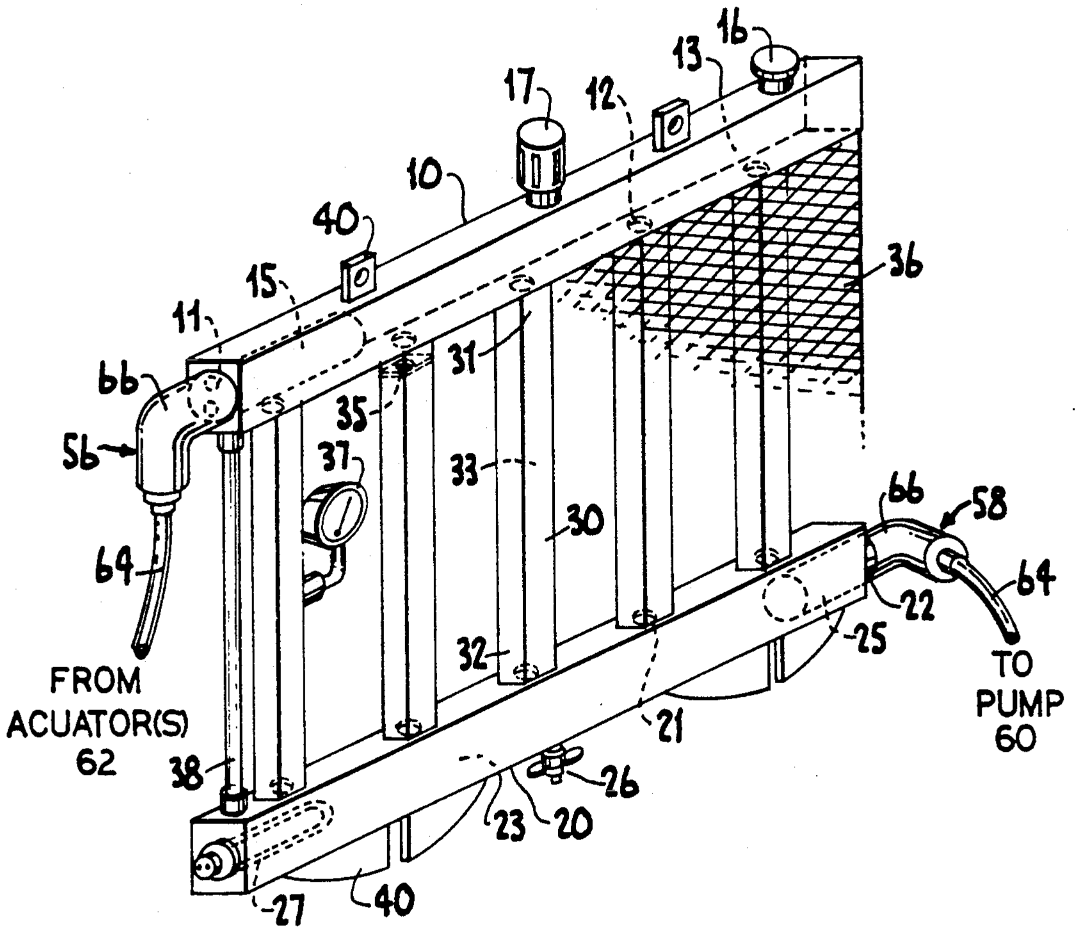
FIG. 1 is a perspective view of a hydraulic oil storage tank according to the invention.

A vehicle headboard and hydraulic oil storage tank is formed as a unit for use in a hydraulic system on a vehicle. The unit comprises at least one hollow body having a substantially closed inner volume and externally defining a protective barrier elongated in mutually perpendicular directions, means for attaching the hollow body to define at least one member at least partially enclosing a vehicle bed, and connection means for connecting the inner volume to a hydraulic pump and actuator. As shown in FIG. 1, the unit may comprise a top header 10, a bottom header 20, a plurality of spaced apart transfer tubes 30 connected between the top and bottom headers to define with the headers a substantially closed volume or reservoir, and means for mounting the unit as a headboard on a vehicle. The top header 10 has at least one inlet 11, a plurality of outlets 12, and is dimensioned to receive a portion of hydraulic oil from the hydraulic system in an interior volume 13. The bottom header 20 has a plurality of inlets 21, at least one outlet 22, and is dimensioned to receive a portion of hydraulic oil from the hydraulic system in an interior volume 23. Each one of the plurality of spaced apart transfer tubes 30 has an upper end 31 connected in fluid-tight manner to the top header 10 at one of the plurality of outlets 12, a lower end 32 connected in fluid tight manner to the bottom header 20 at one of the plurality of inlets 21, and is dimensioned to receive a portion of hydraulic oil from the hydraulic system in an interior volume 33. The tubes and headers preferably are welded together and form a structurally rigid body which also serves as a protective vehicle headboard. The plurality of spaced apart transfer tubes 30 communicate the hydraulic oil from the top header 10 to the bottom header 20 as the hydraulic oil is circulated through the hydraulic system. The plurality of spaced apart transfer tubes also perform a storage function, i.e., storing a portion of the hydraulic oil within their interior volumes 33. The unit comprising the top and bottom headers and the plurality of spaced apart transfer tubes forms a complete storage tank for the hydraulic oil in the hydraulic system.

In a preferred embodiment, the top and bottom headers and each of the plurality of transfer tubes is formed from rectangular tubing, having opposed openings at which the transfer tubes are attached. The rectangular tubing of the headers is closed at each end such as by endplates welded thereto, and of course the ends of the transfer tubes are at least partly open. The header end plates may have provision for the insertion of a hydraulic oil filter, strainer, or other accessory. The tubing preferably has a wall thickness of approximately 3/16 inch, however heavier or lighter gauge material may be appropriate to particular vehicles set up for heavier or lighter duty. Each of the plurality of transfer tubes may have an orifice 35 fixed at an end or at an intermediate position along its length for limiting the flow rate of the hydraulic oil to a predetermined maximum. The orifice may be defined by a flat plate with a hole therethrough, the flat plate being welded or otherwise fixed to partially block the interior of each of the plurality of transfer tubes. The plate defining the orifice also adds additional strength to the headboard.

The unit is suitable for use on any vehicle having a hydraulic oil storage tank as part of a hydraulic system, such as a truck, tractor, earth moving vehicle or railroad car. A truck for which the unit is particularly useful is a flatbed truck for transfer of construction materials and including a hydraulic boom for loading and unloading materials from the bed. The unit is quite suitable for use on any truck, vehicle or the like which already has or could have a conventional headboard and a separate hydraulic oil tank. The unit has at least one bracket 40 dimensioned for mounting the unit on the vehicle in place of the conventional headboard. This provides a cost savings over conventional designs because the separate hydraulic oil tank is eliminated. Also, shorter connection lines 64 and fewer connection fittings 66 are required because the unit is mounted closer to conventionally mounted pumps than in previous designs.

With the unit mounted in place of the conventional headboard, any pump conventionally mounted or even somewhat above the vehicle deck will be below the level of oil maintained in the headboard. Thus the pumps will have an inlet line from the unit which is always flooded with hydraulic oil, thereby reducing the possibility of cavitation at the pumps or connection lines as sometimes occurs where fluid is lifted from a tank to a pump inlet by pump suction.

Another advantage of the unit over the conventional tanks is an increased outer surface area for a given interior volume. The greater surface area provides better heat dissipation for hot hydraulic oil when the hydraulic system is in operation. Accordingly, the storage volume of the unit can be reduced compared to a cylindrical tank unit because the oil stays cooler than in such conventional systems. In a preferred embodiment, the unit also has an expanded metal screen 36 attached across at least a portion of one face, in thermally conductive contact such as by welding. The screen provides for even greater heat dissipation and protection of the passenger compartment.

The headboard tank unit can contain or be integrated with various storage tank accessories found in cylindrical under-bed tanks. For example, the top header can be dimensioned to contain a hydraulic oil filter 15 at the at least one inlet. The hydraulic oil filter may be, for example, in the range of a 3 to 25 micron filter. The top header can also be dimensioned to contain a fill pipe 16 and cap for introduction of hydraulic oil to the hydraulic system, and a breather 17 for evacuation of air from the hydraulic system.

During testing on a prototype design having the hydraulic oil filter 15 in the top header, overflow of the hydraulic oil through the breather 17 was experienced. Further testing on a prototype having the hydraulic oil filter mounted external to the header did not result in overflow of the hydraulic oil. It is therefore presently preferred that the hydraulic oil filter be mounted external to the top header.

The bottom header can be dimensioned to receive at least one hydraulic oil strainer 25 adjacent to the at least one outlet, and a drain 26 having a plug or valve for draining the hydraulic oil from the unit. The bottom header can also be dimensioned to receive a pre-heater 27 for heating the hydraulic oil to a desired temperature, for example in cold weather. These elements are preferably all included with a headboard hydraulic tank supplied as a finished unit ready to be attached to a truck bed and connected in fluid communication with a pump and actuator in the same manner as a cylindrical under-bed tank.

Additional accessories may be included as desired. For example a temperature gauge 37 and a sight glass 38 may be desirable. One of the plurality of transfer tubes may be dimensioned to receive a sensing element for a temperature gauge to provide a temperature of the hydraulic oil within the unit. The temperature gauge may be mounted on the unit or remotely mounted and connected electrically. For the sight glass, one of the plurality of transfer tubes may have fittings suitable to receive the ends of the sight glass in order to provide a visual indication of a level of the hydraulic oil in the unit.

Figure 2:
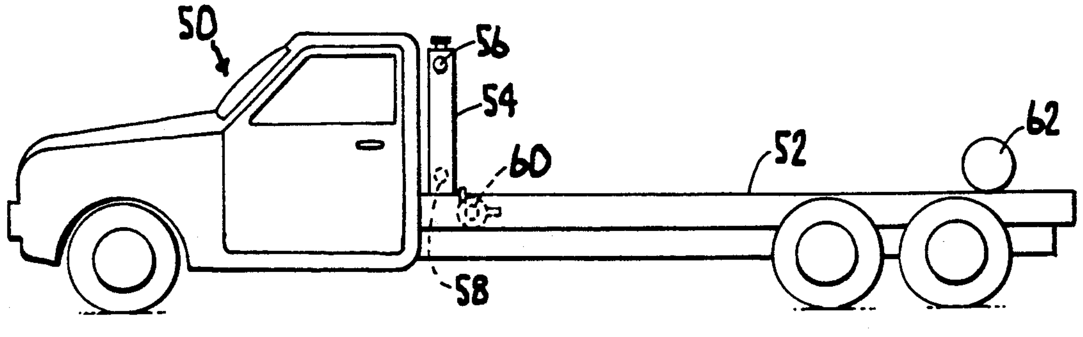
FIG. 2 is a side elevation view of a truck having a storage tank headboard according to the invention.

In an alternative embodiment as shown in FIG. 2, a truck having a bed 52 comprises at least one wall member at the perimeter of the bed, said wall member defining a hollow body having a substantially closed inner volume and externally defining a protective barrier elongated in mutually perpendicular directions. The truck further comprises connection means 56, 58 for connecting the inner volume to a hydraulic pump 60 and actuator 62. The inner volume defines a storage tank for hydraulic oil. The wall member may be, for example, a headboard, tailgate, or sidewall of the bed, and it can contain or be integrated with various storage tank accessories as described above.

The invention having been disclosed, a number of variations will now become apparent to persons skilled in the art. Reference should be made to the appended claims as indicating the scope of the invention in which exclusive rights are claimed.

What is claimed is:

1. In combination with a vehicle a protective and hydraulic system, comprising:

a vehicle having a bed behind a cab;

a vehicle headboard including at least one hollow body having a substantially closed inner volume defining a hydraulic oil storage tank for use in a hydraulic system on the vehicle, and externally defining a protective barrier elongated in mutually perpendicular directions;

means for mounting the hollow body substantially forward on the vehicle bed and parallel to a rear of the cab of said vehicle; and, connection means for connecting the inner volume to a hydraulic pump and actuator, whereby said protective barrier protects said cab from a load on said vehicle bed.

2. The system according to claim 1, wherein the vehicle headboard comprises:

a top header having at least one inlet, a plurality of outlets, and dimensioned to receive a portion of hydraulic oil from the hydraulic system in an interior volume;

a bottom header having a plurality of inlets, at least one outlet, and dimensioned to receive a portion of hydraulic oil from the hydraulic oil system in an interior volume; and a plurality of spaced apart transfer tubes, each one having an upper end connected to the top header at one of the plurality of outlets, a lower end connected to the bottom header at one of the plurality of inlets, and being dimensioned to receive a portion of hydraulic oil from the hydraulic system.

3. The system according to claim 1, wherein the headboard is at least partly defined by hollow tubing.

4. The system according to claim 2, wherein at least one of the top and bottom headers comprises rectangular tubing.

5. The system according to claim 2, wherein at least one of the plurality of transfer tubes comprises rectangular tubing.

6. The system according to claim 2, wherein each of the plurality of transfer tubes has an orifice along its length for limiting a flow of the hydraulic oil to a predetermined maximum.

7. The system according to claim 1, wherein the attaching means comprises at least one bracket fixed to the vehicle headboard, said at least one bracket dimensioned to be removably secured to the vehicle.

8. The system according to claim 2, further comprising at least one hydraulic oil filter at the inlet to the top header.

9. The system according to claim 2, further comprising at least one hydraulic oil strainer at the outlet from the bottom header.

10. The system according to claim 2, further comprising a sight glass connected between the top and bottom headers for providing a visual indication of a level of hydraulic oil within the vehicle headboard and hydraulic oil storage tank.

11. The system according to claim 1, further comprising means for filling the vehicle headboard with hydraulic oil.

12. The system according to claim 11, wherein the filling means comprises a fill pipe fixed at an opening in the hollow body.

13. The system according to claim 2, further comprising a temperature gauge connected to display a temperature of the hydraulic oil in the vehicle headboard.

14. The system according to claim 2, further comprising a pre-heater in contact with the hydraulic oil for heating the hydraulic oil to a desired temperature.

15. The system according to claim 2, further comprising a drain in a lower portion of the bottom header.

16. The system according to claim 1, further comprising an expanded metal screen attached across at least a portion of the vehicle headboard for dissipating heat.

17. A truck having a bed for carrying a load, comprising:

at least one wall member at a perimeter of the bed, said wall member defining a hollow body having a substantially closed inner volume and externally defining a protective barrier elongated in mutually perpendicular directions and positioned on the bed to form a vertical wall along said perimeter; and, connection means for connecting the inner volume to a hydraulic pump and actuator, whereby said protective barrier acts to confine a load on said bed.

18. In combination with a vehicle, a protective and hydraulic system, comprising:

a vehicle having a bed for carrying a load;

a vehicle headboard including at least one hollow body having a substantially closed inner volume and externally defining a protective barrier elongated in mutually perpendicular directions;

means for mounting the headboard vertically on the bed, to thereby confine the load; and, connection means for connecting the inner volume to a hydraulic pump and actuator, said connection means defining at least one of connection lines and connection fittings.

19. The system according to claim 18, wherein the at least one hollow body is at least partly defined by tubing elements.

* * * * *